United States Patent [19]

Karcher, Jr. et al.

[11] 3,799,083
[45] Mar. 26, 1974

[54] WORKPIECE GUIDANCE MECHANISMS

[75] Inventors: Ralph E. Karcher, Jr.; Fred T. MacKenzie, both of Beverly, Mass.

[73] Assignee: USM Corporation, Flemington, N.J.

[22] Filed: Oct. 24, 1972

[21] Appl. No.: 299,944

[52] U.S. Cl. .................................... 112/47, 12/55
[51] Int. Cl. ..................... A43d 11/00, D05b 15/00
[58] Field of Search ........ 112/47, 48, 49, 203, 204, 112/208, 210; 12/55, 55.1

[56] References Cited
UNITED STATES PATENTS

| | | | |
|---|---|---|---|
| 3,080,836 | 3/1963 | Clemens | 112/47 |
| 2,979,745 | 4/1961 | Schaefer | 12/55 |
| 3,088,144 | 5/1963 | Weeks | 12/55.1 |

*Primary Examiner*—Patrick D. Lawson
*Attorney, Agent, or Firm*—Carl E. Johnson

[57] ABSTRACT

A machine having a tool for operating on a workpiece intermittently with means for moving the workpiece is provided with a guidance mechanism comprising means continuously operable on the workpiece for guiding the workpiece relative to the tool. The guiding means may include a control for determining a path along which the workpiece is guided and means responsive to the control and normally effective for guiding the workpiece along the determined path and additionally comprise means responsive to a particular path configuration for additionally controlling the guiding means to steer the workpiece along the particular path configuration. In the preferred embodiment the workpiece moving means are an oscillatory feed dog and presser foot cooperatively engageable with opposite sides of the workpiece wherein the feed dog and presser foot have a zone of greater cooperation and a zone of lesser cooperation.

6 Claims, 8 Drawing Figures

WORKPIECE GUIDANCE MECHANISMS

BACKGROUND OF THE INVENTION

This invention relates to apparatus for automatically guiding a workpiece relative to a tool.

Rising labor costs have promoted recent efforts at automatically guiding workpieces relative to a tool operating on the workpiece. Manual guidance of a workpiece becomes tedious and inaccurate when the path along which the workpiece is to be guided is other than rectilinear and particularly when the path involves sharp or reverse curves. Accordingly, efforts have been made to provide guidance mechanisms which operate automatically. Such automatic guidance is particularly difficult where the workpieces to be operated upon by a tool are irregular and non-rigid, for example, leather or cloth to be operated on by a sewing tool.

Unlike the more cumbersome control means developed in the machine tool industry for orthogonally moving work-carrying tables, means for guiding leather, cloth or other sheet material workpieces have been developed which steer the sheet material by action taken directly on the material itself. One approach is disclosed in United States Letters Patent No. 2,979,745 issued Apr. 18, 1961, in the name of H. F. Schaefer, Jr. et al. This patent discloses a pair of differentially rotatable, workpiece engaging wheels for steering the workpiece operative only in intervals other workpiece moving tools are inoperative. Another approach is disclosed in United States Letters Patent No. 3,080,836 issued Mar. 12, 1963 in the name of J. E. Clemens et al. This patent discloses a single workpiece engaging wheel for steering the workpiece only when workpiece moving means are inoperative. Still another approach is disclosed in United States Letters Patent No. 3,088,144 issued May 7, 1963 in the name of H. W. Weeks. This patent again discloses a single workpiece engaging wheel for steering the workpiece only when workpiece moving means are inoperative. None of these patents show means for additionally controlling workpiece guiding 5 means responsive to a particular of workpiece movement.

Each of the above patents recites workpiece guidance means inoperative during a portion of an operating cycle of the associated machine. It was then thought that a particular point such as a workpiece engaging needle or a turning post about which the workpiece could be pivoted was required for accurate workpiece guidance. Accordingly, the workpiece guidance mechanism was disabled during portions of the operating cycle of the associated machine during which such convenient turning points were not available. Additionally, machines built according to the teachings of the above patents are incapable of guiding a workpiece along particular paths.

SUMMARY OF THE INVENTION

Accordingly, it is an object of the invention to provide a continuously operable workpiece guidance mechanism preferably having means for guiding the workpiece along particular path configurations.

To this end, a machine having a tool for operating on a workpiece intermittently with means for moving the workpiece is provided with a guidance mechanism having means continuously operable on the workpiece for guiding the workpiece relative to the tool. A control for determining a path along which the workpiece is guided and means responsive to the control and normally effecting guidance of the workpiece along the determined path are provided. A preferred embodiment of the invention additionally has means responsive to a particular determined path configuration for additionally controlling the workpiece guiding means for guiding the workpiece along the particular path. The preferred embodiment is additionally provided with zones of greater and lesser cooperation between means for moving the workpiece having an area of cooperative engagement with the workpiece for moving the workpiece.

DESCRIPTION OF THE DAWINGS

A preferred embodiment of the invention which is intended to illustrate and not to limit the invention will now be described with reference to drawings of the embodiment in which.

DESCRIPTION OF THE PREFERRED EMBODIMENTS

Figure 1:
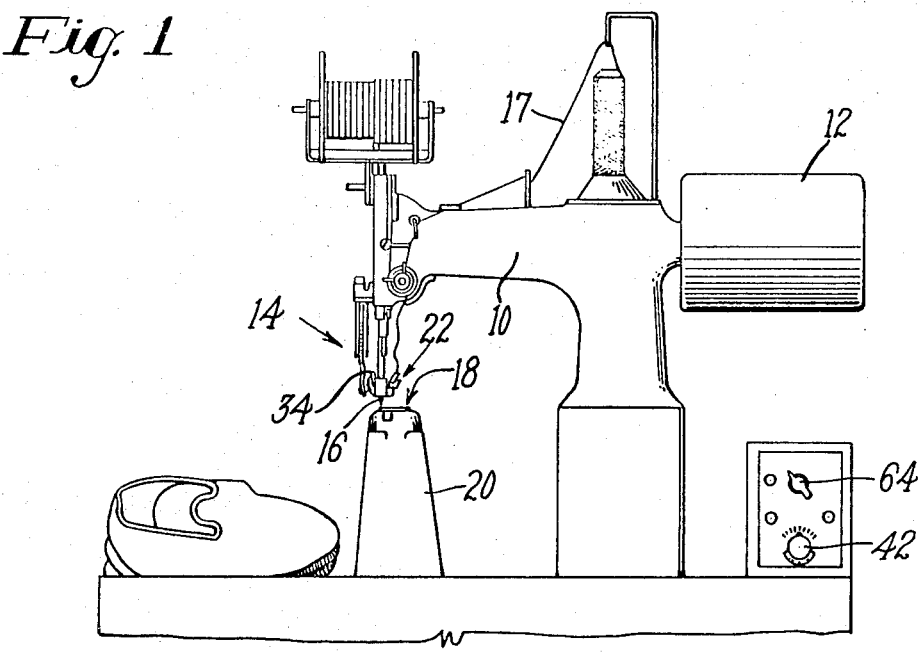
FIG. 1 is a front view of the preferred embodiment including a sewing machine.

FIG. 1 shows a sewing machine 10 substantially of a type well known in the art. The machine is provided with a motor 12 for driving stitch-forming instrumentalities, generally at 14. The stitch-forming instrumentalities include a needle 16 adapted for carrying thread 17 through a workpiece 19 (FIG. 2) placed on a support comprising a cover generally at 18 for a hook post 20 housing additional stitch-forming instrumentalities. The machine is also provided with means generally at 22 for guiding a workpiece relative to a tool of the stitch-forming instrumentalies, for example, the needle 16.

Figure 2:
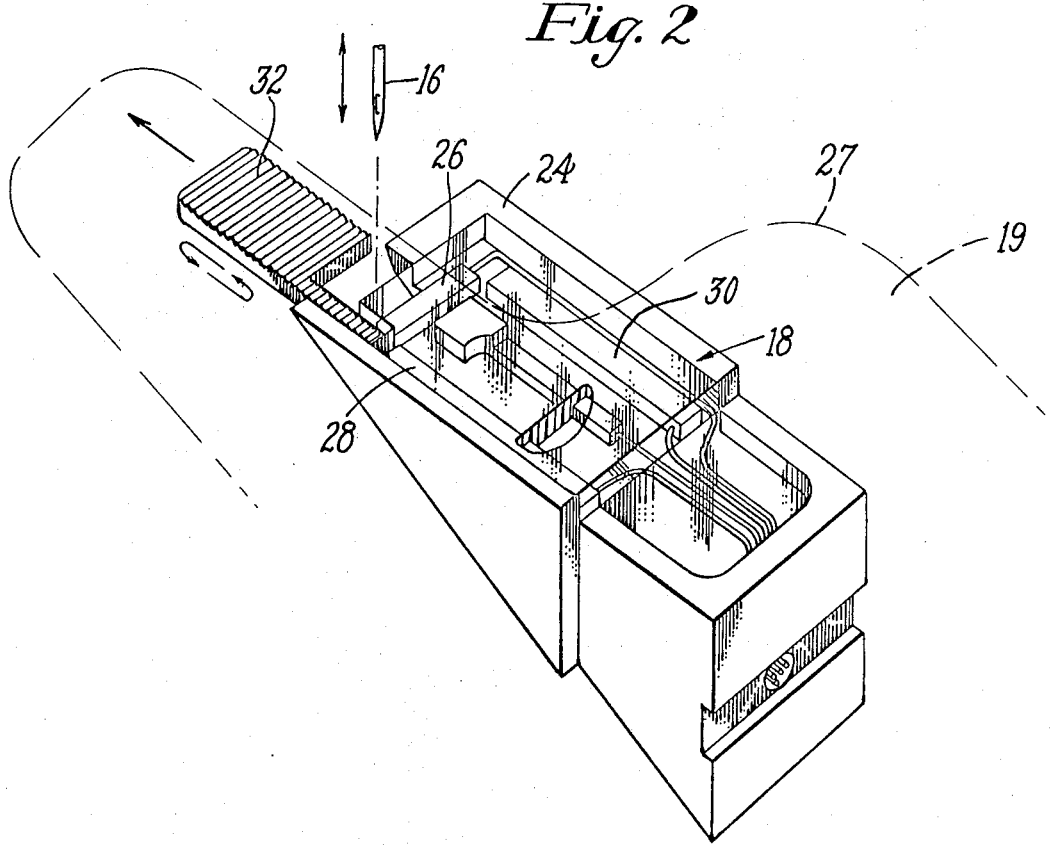
FIG. 2 is a perspective view of a portion of the machine in FIG. 1.

As seen in FIG. 2 the hook post cover has a portion 24 housing a photovoltaic device 26 responsive to light from above the cover and adjacent the workpiece positioned on the cover relative to the needle 16 for generating a signal for a control determining a path of workpiece movement generally parallel to and marginally spaced from an edge 27 of the workpiece. An additional photoelectric device 28 may provide an additional signal to the control. As thus described, the embodiment is generally similar to that disclosed in the above recited Clemens et al. patent.

The cover portion 24 additionally houses another photoelectric device 30 responsive to a particular path of workpiece movement in which the path parallels an edge of the workpiece extending generally from the photovoltaic device 26 toward the device 30 and away from the device 28. Such a particular path configuration is conveniently called an inside radius curve.

As further seen in FIG. 2, the hook post cover accommodates a feed dog 32 generally oscillatory about plane extending normally to stitch-forming, longitudinal movement of the needle 16. As in known sewing machines and further described in the above recited Clemens et al. patent, the feed dog and needle intermittently engage the workpiece positioned on the hook post cover, the former to move the workpiece and the latter to form stitches.

Figure 3:
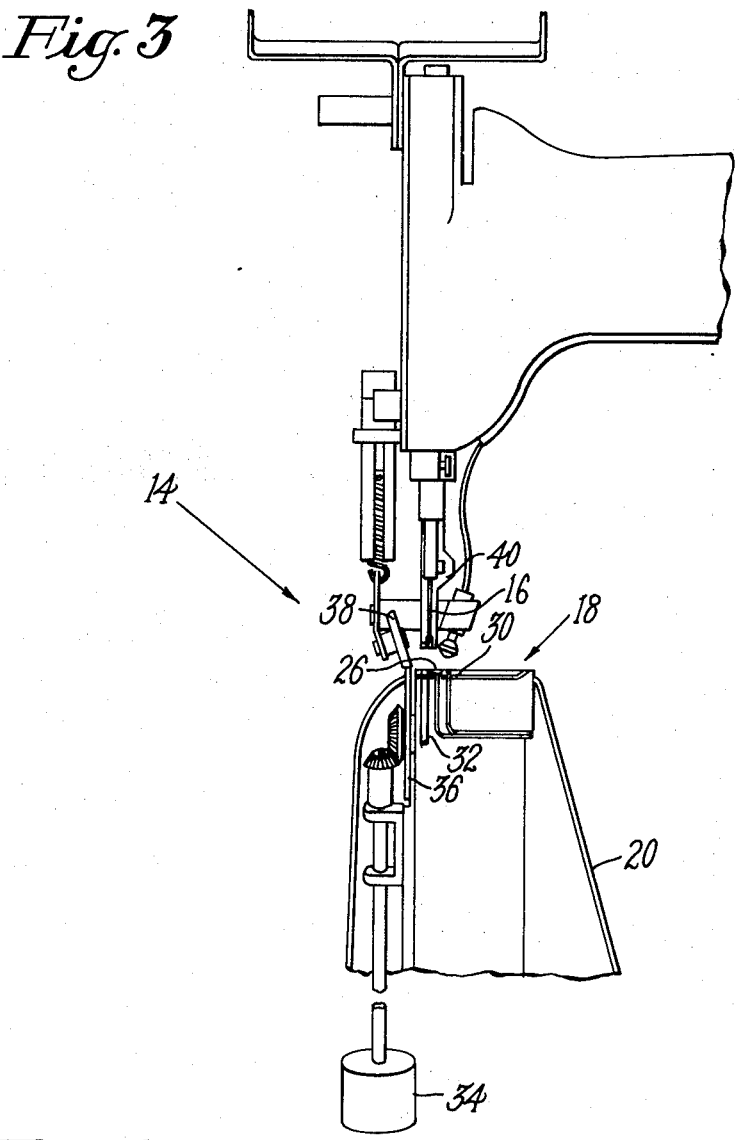
FIG. 3 is an enlarged view of a portion of the machine in FIG. 1.

In further similarity with the disclosure of the above recited Clemens et al. patent, control signals from the photovoltaic device 26 are supplied to further control elements which generate driving signals for a servo-motor 34 shown in FIG. 3. The servo-motor is operatively connected for rotating a workpiece steering disk 36 having a workpiece engaging edge extending substantially into the plane of the cover 18 for engaging a workpiece supported on the cover. A servo-roll 38 is resiliently positioned relative to the disk 36 to cooperatively engage a workpiece between the roll and disk. The roll may be raised with a presser member to position a workpiece relative to the stitch-forming instrumentalities but thereafter, unlike the disclosure in the above recited Clemens et al patent, continuously cooperates with the disk 36 to engage a workpiece thereby continuously maintaining operability of the workpiece guiding means.

Figure 4:
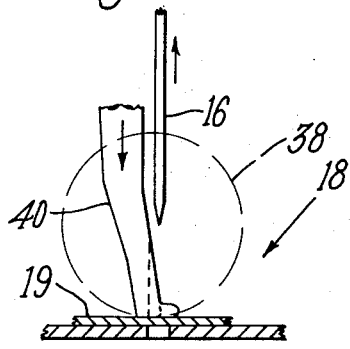
FIG. 4 is a side view of elements of the machine shown in FIG. 3 in one operating position.
Figure 5:
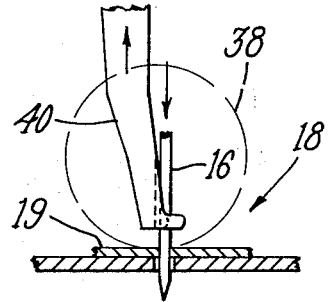
FIG. 5 is a side view of the elements shown in FIG. 4 in another position.

Further unlike the disclosure of the above recited Clemens et al patent but generally as known in the art, the machine is provided with a presser foot 40 operable intermittently with respect to the needle 16 to each engage the workpiece on the cover generally at 18. The workpiece engaging positions of the needle and presser foot are shown in FIGS. 4 and 5 and the operating movements of the needle and presser foot are such that one or the other is substantially continually engaged with the workpiece.

When the presser foot engages the workpiece, workpiece guiding rotation of the disk 36 in cooperation with workpiece engagement by the servo-roll 38 pivots the workpiece about a pivot defined by the cooperative area of workpiece engagement of the presser foot 40 and feed dog 32. On the other hand, when the needle engages the workpiece, workpiece guiding rotation of the disk 36, with the cooperation of roll 38, pivots the workpiece about the needle. These workpiece guiding means are normally effective to guide the workpiece along the path determined by the control generating the driving signals for the servo-motor 34 of the guiding means.

Figure 6:
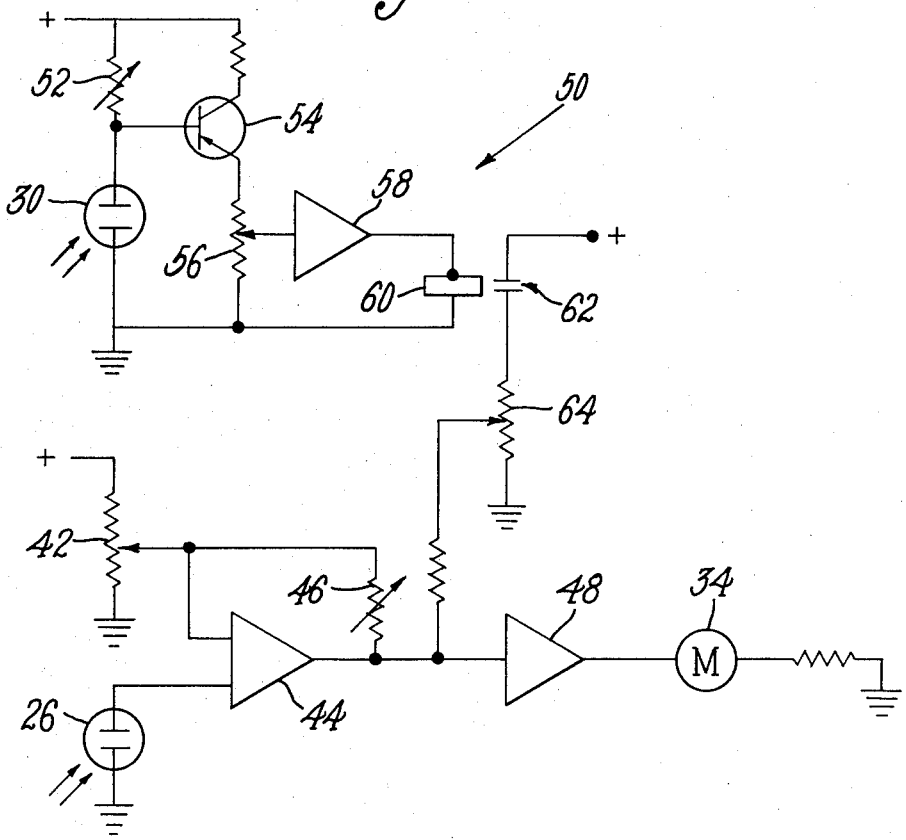
FIG. 6 is a schematic of a control for the preferred embodiments.

However, for a particular path configuration of a relatively small inside radius curve, the control is ineffective for causing the means for guiding the workpiece to guide the workpiece along the particular path. Instead, the actual path differs from that determined by the control including device 26 by deviating toward the edge 27 of the workpiece. Referring to FIG. 6, the normally effective control receives a voltage signal from the photovoltaic device 26 proportional to the amount of the cell 26 covered by the workpiece. An additional signal from potentiometer 42 biases the signal from the device 26 to establish a desired marginal spacing from the workpiece edge 27 at which it is determined to position the workpiece relative to the point of needle engagement with the workpiece. The biased signals are amplified by amplifier 44 having a gain adjustable by variable resister 46 and then further amplified by power amplifier 48 to provide driving signals to the servo-motor 34.

Additional control means generally at 50 detect with photobarrier device 30 inside radius curves of the edge 27 of the workpiece relative to which the marginally spaced path of the workpiece is determined. A variable resister 52 is connected to the device 30 as a potential divider between a voltage source and ground. The divided potential is provided to the base of a PNP transistor 54, the collector and emitter of which are appropriately connected between the potential source and ground along a path including a potentiometer 56. When the photobarrier device 30 is fully illuminated, as when there is no inside radius curvature to the workpiece, the device has a high resistance relative to that set for the resister 52. A relatively high voltage is then applied to the base of transistor 54 so that the transistor will not conduct. To provide maximum sensitivity to the additional control, the resistance of the variable resister 52 may be reduced relative to that of the device 30 until the transistor 54 is on the verge of conduction across the collector-emitter junction.

As the photobarrier device 30 is then partially covered by the workpiece, the resistance of the device decreases, thereby providing a lower voltage to the base of transistor 54. The transistor 54 will then conduct to provide a signal, as adjusted by potentiometer 56, to amplifier 58. The potentiometer 56 provides a further sensitivity adjustment for the additional control 50 by adjusting the strength of the signal to be amplified by amplifier 58. The adjusted, amplified signal from amplifier 58 energizes relay coil 60 to close normally open relay contacts generally at 62.

The contacts connect a voltage source through potentiometer 64 to the signal provided power amplifier 48 from photovoltaic device 26. The potentiometer 64 adjusts the magnitude of the voltage signal provided the power amplifier through the relay contacts by appropriately increasing or decreasing the addition through the contacts to the voltage signal received from the photovoltaic device 26. Accordingly, the signal through the relay contacts 62 biases the servomotor driving signals from power amplifier 48 to compensate for the inherent tendency of the normally effective workpiece guiding means to deviate from the determined path on inside radius curves. The workpiece guiding means then cause the workpiece to follow the path determined by the control.

Figure 7:
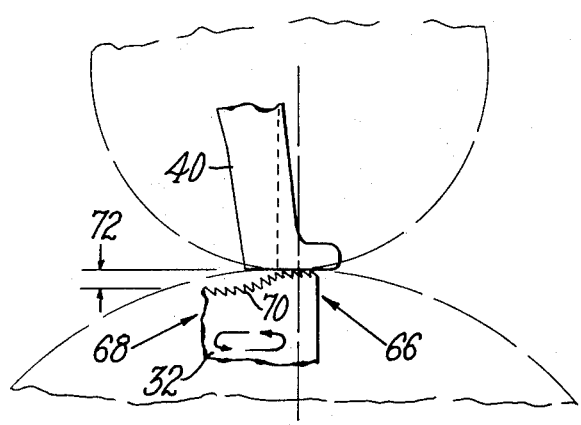
FIG. 7 is an enlarged side view of elements of the machine in FIG. 1.
Figure 8:
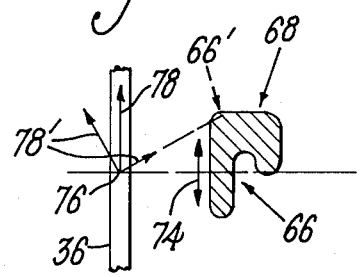
FIG. 8 is a top view of the elements shown in FIG. 7.

FIGS. 7 and 8 illustrate a further feature of the preferred embodiment. Since the workpiece guiding means are now desired to be continuously operable, the workpiece guiding means may attempt to guide the workpiece by pivoting the workpiece relative to its area of cooperative engagement by the workpiece moving means of the presser foot 40 and feed dog 32. Indeed, such workpiece guiding is most likely as the greatest need for workpiece guidance arises during workpiece movement rather than during needle penetration of the workpiece.

Especially with particularly flimsy workpiece materials, the area of cooperative engagement of the workpiece by the feed dog and presser foot may be sufficiently large to undesirably buckle or stretch the workpiece when such workpiece guiding pivoting is attempted about the area. on the other hand, to reduce the area of engagement of the workpiece by the presser foot and feed dog to eliminate the buckling and stretching also reduces the area of effective cooperation between the feed dog and presser foot for moving the workpiece.

Accordingly, the feed dog is divided into a zone generally at 66 of greater cooperation with the presser foot and a zone generally at 68 of lesser cooperation with the presser foot for moving the workpiece. To this end, a workpiece engaging surface 70 of the feed dog is inclined away from the presser foot from the zone 66 to the zone 68 a maximum elevation distance 72 in a range of from 0.005 inch to 0.500 inch and preferably about 0.020 inch. To further facilitate guidance pivoting of the workpiece while engaged by the presser foot and feed dog, the zone 66 of greater workpiece moving cooperation between the feed dog and presser foot will have a relatively small area of cooperation with the foot about which the workpiece may be pivoted. It is to be understood, however, that the entire workpiece engaging surface 70 of the feed dog engages the workpiece for moving the workpiece in cooperation with the presser foot 40. Similarly, it is to be understood that the zones 66 and 68 are zones of workpiece moving cooperation between the presser foot and feed dog; therefore, they may be defined by a configuration of the presser foot in an alternative embodiment of the invention.

The zone 66 moves with workpiece moving movement of the feed dog, the extent and general direction of such movement of a center line of the zone 66 being indicated by the arrow 74 in FIG. 8. The extent of movement of the center line of the zone generally at 66 is preferably perpendicularly bisected by a line passing through the point 76 of engagement of the workpiece between the steering disk 36 and the servo-roll 38. Accordingly, guiding pivotal movement of the workpiece will have tangential vector 78 direction in the plane of rotation of the disk 36. Maximum efficiency of the cooperative work guiding disk 36 and roll 38 will then be achieved. If the zone generally at 66 were otherwise located, for example generally at 66', the workpiece guiding action of the disk 36 would resolve into the direction vectors 78' thereby reducing the efficiency of the pivotal work guiding action of the disk 36.

Having thus described our invention in relation to a preferred embodiment, it should be understood that other embodiments, for example an embodiment without a sewing machine, are contemplated within the scope of our invention defined by the following claims:

We claim:

1. In a machine having a tool for operating on a workpiece intermittently with means for moving the workpiece, and having normally effective work guidance mechanism for determining the path along which the workpiece is to be guided with respect to the tool, the improvement which comprises a control means responsive to a particular determined guidance path configuration for influencing the normally effective guidance mechanism to guide the workpiece along the particular path configuration.

2. In a machine having a tool for operating on a workpiece intermittently with means for moving the workpiece, and having normally effective work guidance mechanism for determining the path along which the workpiece is to be guided with respect to the tool, the improvement which comprises a control means particularly responsive to inside radius curvature for influencing the nornally effective guidance mechanism to guide the workpiece along said inside radius curvature.

3. A machine comprising a tool for operating on a workpiece intermittently with means for moving the workpiece, a normally effective work guidance mechanism for determining the path along which the workpiece is to be guided with respect to the tool, and additional work guidance control means comprising a photobarrier device responsive to a particular determined path configuration, said device being arranged adjacent to the workpiece when positioned relative to the tool but disposed to be at least partially covered by the workpiece at said particular path configuration.

4. In a machine having a tool for operating on a workpiece intermittently with means for moving the workpiece, and having normally effective work guidance mechanism for determining the path along which the workpiece is to be guided with respect to the tool, the improvement which comprises a control means responsive to a particular determined guidance path configuration for influencing the normally effective guidance mechanism to guide the workpiece along the particular path configuration, and said workpiece moving means includes workpiece moving and presser foot members cooperatively engaging the workpiece and having a zone of greater cooperation and a zone of lesser cooperation.

5. A machine as in claim 4 wherein the zones are defined by a workpiece engaging surface of one member inclined away from the other member from the zone of greater cooperation to the zone of lesser cooperation.

6. A machine as in claim 5 wherein the inclination has a maximum elevation distance in a range of from 0.005 inch to 0.500 inch.

* * * * *